(12) United States Patent
Otxoa-Aizpurua Calvo et al.

(10) Patent No.: US 12,208,932 B2
(45) Date of Patent: Jan. 28, 2025

(54) VERTICAL PACKAGING MACHINE

(71) Applicant: ULMA Packaging, S. Coop., Oñati (ES)

(72) Inventors: Alberto Otxoa-Aizpurua Calvo, Oñati (ES); Eneko Izquierdo Ereño, Oñati (ES)

(73) Assignee: ULMA Packaging, S. Coop, Oñati (ES)

( * ) Notice: Subject to any disclaimer, the term of this patent is extended or adjusted under 35 U.S.C. 154(b) by 127 days.

(21) Appl. No.: 18/167,190

(22) Filed: Feb. 10, 2023

(65) Prior Publication Data

US 2023/0249859 A1    Aug. 10, 2023

(30) Foreign Application Priority Data

Feb. 10, 2022  (EP) .................................... 22382111

(51) Int. Cl.
  *B65B 37/00*   (2006.01)
  *B65B 39/00*   (2006.01)
  *B65G 17/12*   (2006.01)

(52) U.S. Cl.
  CPC .......... *B65B 37/005* (2013.01); *B65B 39/007* (2013.01); *B65G 17/126* (2013.01)

(58) Field of Classification Search
  None
  See application file for complete search history.

(56) References Cited

U.S. PATENT DOCUMENTS

| 4,722,373 A | 2/1988 | Roovers |
| 6,311,743 B1 * | 11/2001 | Baroncini ............... B65B 5/103 |
| | | 141/237 |
| 11,760,517 B2 * | 9/2023 | Otxoa-Aizpurua Calvo ............... |
| | | B65B 9/20 |
| | | 53/432 |

FOREIGN PATENT DOCUMENTS

| EP | 229385 A  * | 7/1987 | ........... B65B 37/005 |
| EP | 1184282 A1 * | 3/2002 | ........... B65B 37/005 |

OTHER PUBLICATIONS

European Search Report, EP 22382111, Jul. 14, 2022, 5 pages.

* cited by examiner

*Primary Examiner* — Kavel Singh
(74) *Attorney, Agent, or Firm* — Edell, Shapiro & Finnan, LLC

(57) ABSTRACT

A vertical packaging machine that includes a forming tube having an inner passage section and retaining means associated with the forming tube. The retaining means includes a retaining device configured to be displaced between a blocking position (P1) in which it at least partially blocks the inner passage section of the forming tube, and a release position (P2) in which it does not block said inner passage section of the forming tube. While in the blocking position (P1), the retaining device is arranged at a fixed specific height and is configured to prevent a product from passing through the inner passage section of the forming tube. Upon transitioning to the release position (P2), the retaining device is withdrawn from the path to be followed by the product.

17 Claims, 8 Drawing Sheets

VERTICAL PACKAGING MACHINE

CROSS-REFERENCE TO RELATED APPLICATIONS

This application relates to and claims the benefit and priority to European Application No. EP22382111.7 filed on Feb. 10, 2022.

TECHNICAL FIELD

The present invention relates to vertical packaging machines.

BACKGROUND

A vertical packaging machine comprises a hollow forming tube with an inlet opening and an outlet opening downstream of the inlet opening. The forming tube is configured for receiving a continuous film from a film feeder and for imparting a tubular shape to said film. The machine comprises a longitudinal sealing tool for longitudinally sealing said tubular-shaped film, a film tube being generated.

The machine further comprises a transverse sealing and cutting tool downstream of the forming tube for cutting the film tube and sealing said film tube on both sides of the cut, generating a film tube closed at an end upstream of the cut, and a closed package downstream of the cut. A product to be packaged is fed to the forming tube through its inlet opening and exits through the outlet opening, being deposited on the transverse sealing and cutting tool or on the closed end of the film tube as a last resort. The machine comprises a drawing tool for causing the film tube to move forward, such that when the transverse sealing and cutting tool acts downstream of the forming tube and of the transverse sealing and cutting tool there is a part of the film tube that comprises product therein. Therefore, after actuating said transverse sealing and cutting tool, said product is packaged in a package that is physically separated from the film tube.

As it falls along the tube, the speed of the product increases due to gravity. This may mean, particularly the longer the length of the forming tube, that the product hits against the transverse sealing and cutting tool and breaks or becomes damaged due to the force of the impact, or else the product tears or breaks the film tube, for example, upon impact against the seal of the closed end or against the walls of said film tube, thereby affecting package integrity.

To solve this problem, the forming tube can be tilted with respect to the vertical, thereby reducing the rate of fall.

U.S. Pat. No. 4,722,373 also discloses a machine that solves these problems. In this machine, there is a plurality of platforms distributed inside the forming tube at different heights, integrally displaced vertically towards the outlet opening. Inside the forming tube there is arranged a vertical wall longitudinally dividing the forming tube into two areas. A first area where the product to be packaged is fed and where the platforms are downwardly displaced in extended form, and a second area where no product is fed and where said platforms return, folded up. Each product to be packaged that is fed into the forming tube is supported on a platform and lowered through said first area of the forming tube accompanied by the corresponding platform. Therefore, the product no longer accelerates as it falls through the forming tube due to the effect of gravity, and it only suffers said acceleration between the outlet opening of the forming tube where the platform is no longer supporting it and the transverse sealing and cutting tool or the sealed end of the film tube, the risk of hitting the product or negatively affecting package integrity being eliminated or reduced. This allows arranging a plurality of products within the forming tube simultaneously, whereas many products as there are platforms may be present simultaneously inside the forming tube.

SUMMARY

Disclosed is a vertical packaging machine that comprises a vertical forming tube with a product inlet opening, a product outlet opening downstream of the inlet opening and an inner passage section.

The machine further comprises retaining means associated with the forming tube and comprising at least one retaining device configured for being displaced between a blocking position in which it at least partially blocks the inner passage section of the forming tube between the inlet opening and the outlet opening, and a release position in which it does not block said inner passage section of the forming tube. In the context of the invention, "does not block" must be interpreted to mean that it does not prevent the product from passing through the inside of the forming tube (through the corresponding passage section), and "at least partially blocks" must be interpreted to mean that it prevents the product from passing through the inside of the forming tube (through the corresponding passage section).

The retaining device is arranged at a fixed specific height with respect to the outlet opening of the forming tube in the blocking position, and configured for, in the blocking position, preventing a product from passing through said inner passage section of the forming tube and for, upon transitioning from the blocking position to the release position, being withdrawn from the path to be followed by said product through said inner passage section of the forming tube.

Therefore, in a simple manner, the product is successfully lowered in a stepped manner along the forming tube due to the effect of gravity, without requiring any accompanying element, and when the product exits the forming tube through the outlet opening, it does not exit at a speed that may damage said product upon hitting against the transverse sealing and cutting tool, or that may negatively affect package integrity upon impact of said product directly against the walls or against the seals of the film tube. Furthermore, by preventing the retaining device from moving vertically inside the forming tube in the blocking position, at the same time preventing said retaining device from having to return inside the forming tube to its initial starting point, a large inner passage section of the forming tube is successfully utilized in a simple manner, allowing a larger quantity of product to be fed, as well as the consumption of film for generating the packages to be optimized.

These and other advantages and features will become apparent in view of the figures and detailed description.

DETAILED DESCRIPTION

Figure 1:
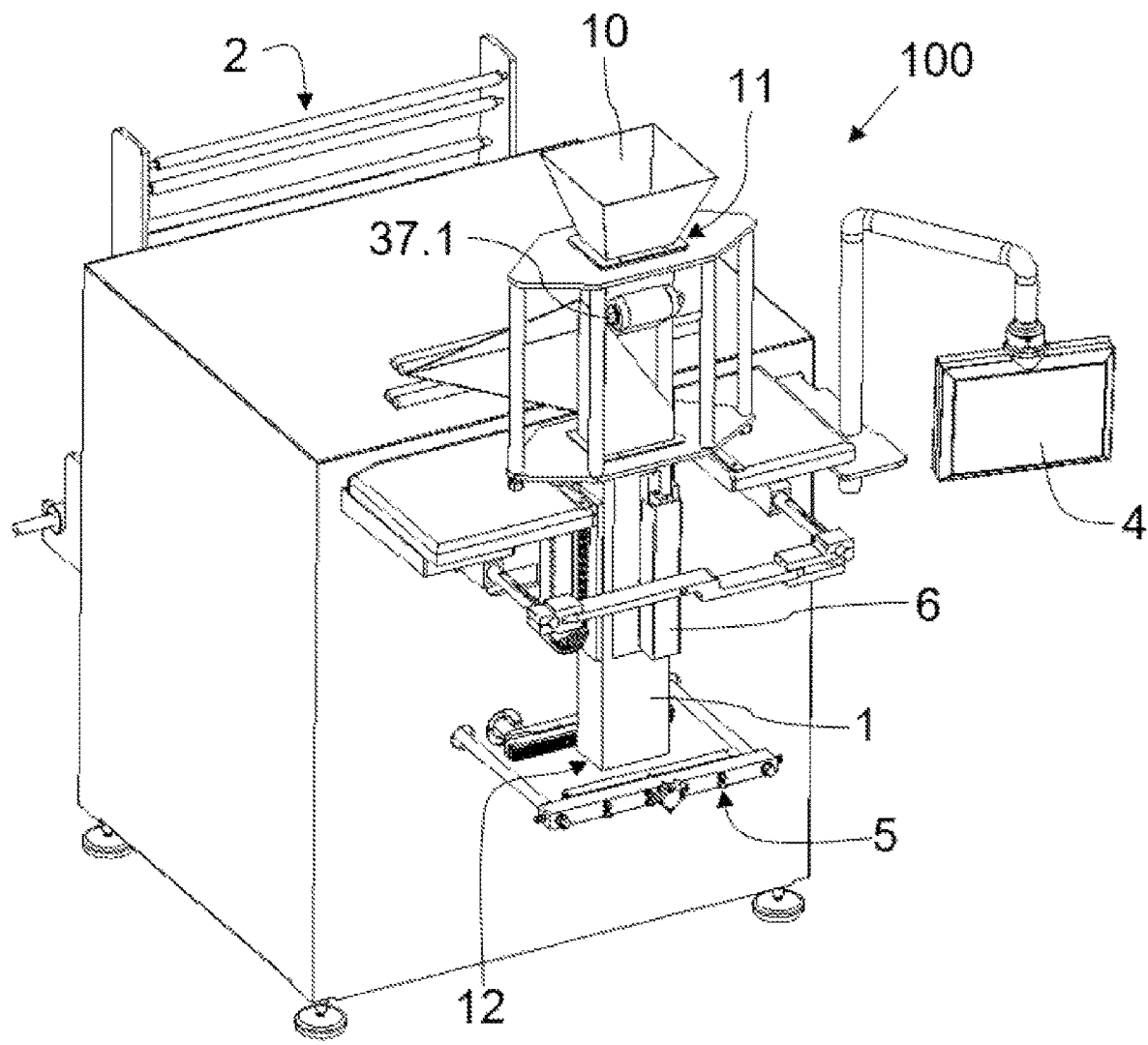
FIG. 1 shows a vertical packaging machine according to a first embodiment.

The vertical packaging machine 100, as the one shown by way of an example in FIG. 1, comprises a hollow vertical forming tube 1 in which the products to be packaged are introduced. The forming tube 1 comprises an inlet opening 11 through which the products to be packaged enter said forming tube 1, an outlet opening 12 downstream of the inlet opening 11 through which said products exit the forming tube 1, and an inner passage section longitudinally demarcated between the inlet opening 11 and the outlet opening 12, through which the products to be packaged fall. The inner passage section is preferably kept constant along the entire length of the forming tube 1.

The forming tube 1 preferably comprises at least two vertical walls facing and parallel to one another. The forming tube 1 is preferably rectangular, such that said inner passage section is rectangular and is demarcated between four inner vertical walls of the forming tube 1. When the forming tube 1 is rectangular, a first vertical wall of said forming tube 1 is facing a third vertical wall of said forming tube 1 and a second vertical wall of said forming tube 1 is facing a fourth vertical wall of said forming tube 1, with each vertical wall preferably being at 90° with respect to the contiguous vertical wall.

The machine 100 also comprises:
- a film feeder 2 for feeding to the forming tube a continuous film not depicted in the figures, with the forming tube 1 being configured for imparting a tubular shape to said film;
- a longitudinal sealing tool 6 configured for longitudinally sealing the longitudinal ends of the tubular-shaped film surrounding the forming tube 1 to one another, a film tube not depicted in the figures being generated; and
- a transverse sealing and cutting tool 5 arranged downstream of the forming tube 1 and configured for transversely sealing and cutting the film tube, a closed film tube being obtained upstream of the transverse cut and a closed package (not depicted in the figures) that is physically separated from the film tube being obtained downstream of said transverse cut, the corresponding product being packaged in the package.

The machine 100 preferably comprises a hopper 10 arranged upstream of the forming tube 1 and communicated with the inlet opening 11 of said forming tube 1, such that the product falls through the hopper 10, is introduced into the forming tube 1 through the inlet opening 11 and exits said forming tube 1 through the outlet opening 12. Depending on when the transverse sealing and cutting tool 5 acts on the film tube to perform sealing and cutting, and on when and at what speed the product reaches the outlet opening 12 of the forming tube 1, the product may fall against the transverse sealing and cutting tool 5 if said tool is acting on or over the closed end of the film tube if the transverse sealing and cutting tool 5 is not acting on the film tube. Accordingly, the product may become damaged or break due to the impact against the transverse sealing and cutting tool 5, or package integrity may be compromised, for example, by causing said sealed end of the film tube to break. This problem becomes more relevant the longer the length of the forming tube 1.

To solve this problem, the machine 100 further comprises retaining means which is associated with the forming tube 1 and comprise at least one retaining device 3, which enable the product to descend through the forming tube 1 in a stepped manner. In some embodiments, the retaining means is connected to the forming tube 1, the retaining means thereby being directly associated with the forming tube 1, while in other embodiments the machine 100 comprises a retaining structure 101 housed inside the forming tube 1 and fixed to the forming tube 1, and the retaining means is connected to said retaining structure 101 such that it is associated with the forming tube 1 through said retaining structure 101. The retaining structure 101 is preferably hollow, the retaining means being housed in said retaining structure 101 (at least partially), and it may comprise a closed or open perimeter. For example, in the case of a rectangular forming tube 1 the retaining structure 101 may also be rectangular (closed perimeter) or may comprise three U-shaped or otherwise similarly shaped vertical walls (perimeter open), but whether it is an open or closed perimeter, it preferably follows the shape of the forming tube 1 (except in the open part, in the event of being an open perimeter).

The retaining means may comprise a number of retaining devices 3 which preferably depends on the length of the forming tube 1 and/or on the features of the product P to be packaged, so there may be machines 100 with a single retaining device 3 and machines 100 with a plurality of retaining devices 3. In cases where the machine 100 comprises a plurality of retaining devices 3, said retaining devices 3 are distributed longitudinally along the length of the forming tube 1.

Figure 2:
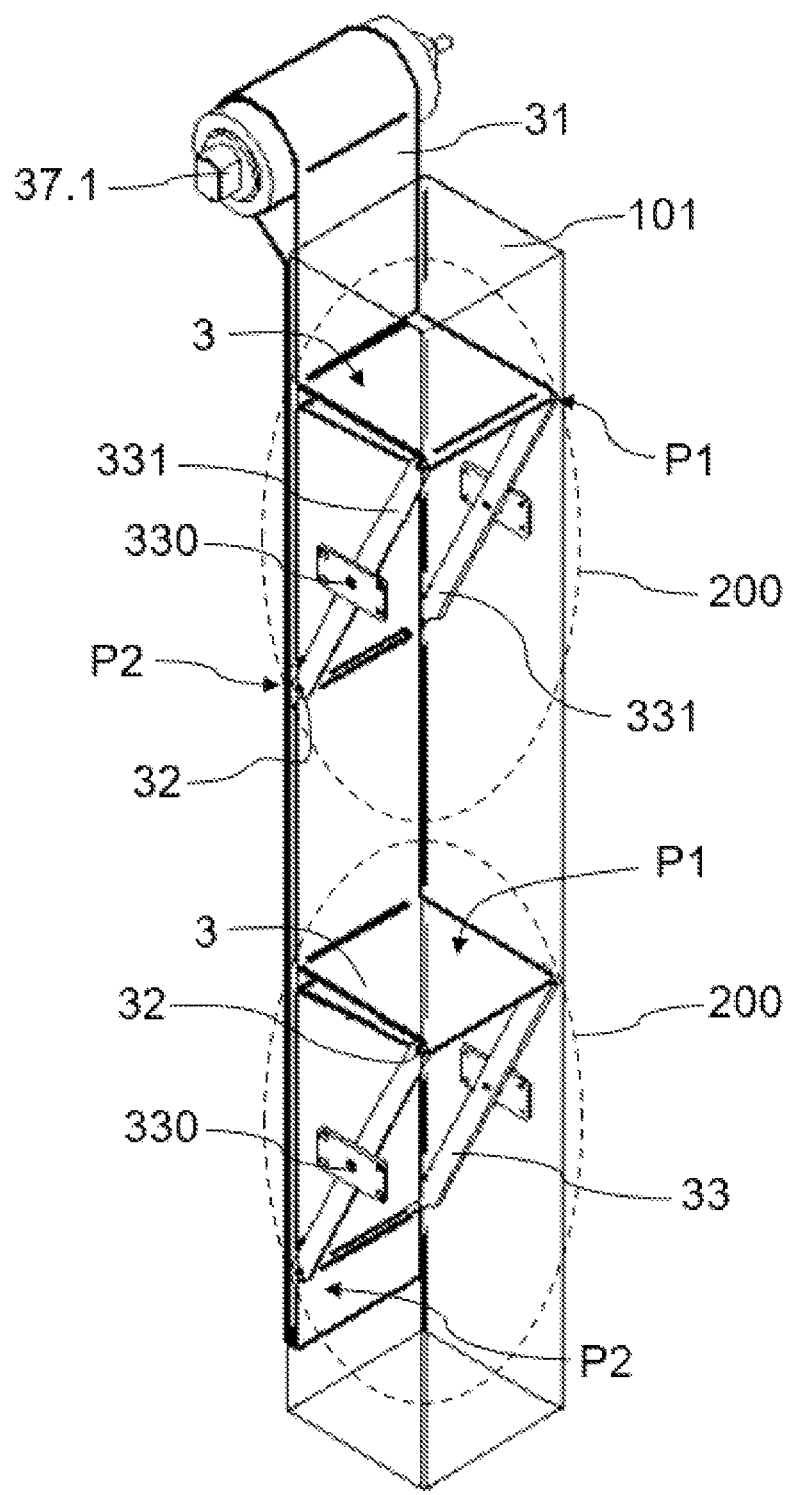
FIG. 2 shows a perspective view of retaining means of the machine of FIG. 1, connected to a retaining structure of said machine.

FIG. 2 depicts by way of example the retaining means of a first embodiment of a machine 100 comprising a plurality of retaining devices 3, with said retaining means being connected to a retaining structure 101 (having an open perimeter in this case) of said machine 100. The vertical walls of the retaining structure 101 can be made of a transparent material like in FIG. 2 (methacrylate, for example), although they could be made of opaque materials.

The retaining device 3 prevents the rate of fall of the product inside the forming tube 1 from increasing uncontrollably from the inlet opening 11 to the outlet opening 12, due to the effect of gravity, such that the product successfully reaches the end of the film tube or hits against the transverse sealing and cutting tool 5 at a lower speed compared with a machine without any retaining device like the one proposed, preventing the product from being damaged or broken or package integrity from being compromised for this reason (or at least largely reducing the risk of these problems).

In all the embodiments of the machine 100, a retaining device 3 is configured for being arranged in a blocking position P1 and in a release position P2 (see FIGS. 3A and 3B, for example) and for being displaced between said positions P1 and P2. During the position change of a retaining device 3, furthermore, at least one element is displaced or moved as will become apparent throughout the description, thereby being interpreted to mean in the context of the invention that any element moving during the position change of a retaining device 3 is a moving element.

The retaining means of the machine 100 further comprises actuating means for causing said position changes of the retaining device 3, and said actuating means may comprise active means 37.1 for causing all the position changes, or active means 37.1 for causing the position change in one direction (for example from the release position P2 to the blocking position P1 of a retaining device 3) and passive means 37.2 for causing the position change in the opposite direction (in this example, from the blocking position P1 to the release position P2 of said retaining device 3). The passive means 37.2 does not require a control signal to act and may comprise, for example, at least one spring, a pulley, or a counterweight. The active means 37.1, in turn, require a control signal to act and may comprise, for example, at least one actuator in the form of a controllable motor or cylinder. Based on the embodiment of the machine 100, the active means 37.1 could comprise a plurality of actuators, in which cases the actuation of said actuators would preferably be synchronized and/or coordinated. The actuating means is configured for acting on at least one of the moving elements. All the moving elements of a retaining device 3 are associated with one another, such that acting on one of them may be sufficient to cause the position change required for said retaining device 3 (said actuation may cause the movement of all the moving elements).

Based on the embodiment of the machine 100, as it will be described in detail throughout the description, different retaining devices 3 are associated with one another, where acting on one of the moving elements of said retaining devices 3 may be sufficient to cause the displacement of all these retaining devices 3. When there are retaining devices 3 not associated with one another, it is possible for the actuating means to require at least two active means 37.1: one for causing the displacement of a first retaining device 3 and all the retaining devices 3 associated with said first retaining device 3 and another one for causing the displacement of a second retaining device 3 (not associated with the first retaining device 3) and all the retaining devices 3 associated with said second retaining device 3.

The machine 100 comprises a control unit 4 for controlling the position changes of the retaining device 3, and said control unit 4 can be a unit specific for performing this function, or it can be the general control unit of the machine 100 or another control unit with additional functions. In particular, the control unit 4 is communicated with the active means 37.1 of the actuating means and configured for controlling the actuation of said active means 37.1 with respect to the corresponding moving element (or moving elements). A control unit 4 can be, for example, a microcontroller, a microprocessor, an FPGA or any other type of device with computing and/or control capability.

The position change of the retaining devices 3 and the feed of the product are preferably coordinated to improve efficiency and productivity of the machine 100. The product is usually supplied to the forming tube 1 from a product dispenser (not depicted in the figures) arranged upstream of the forming tube 1 and of the hopper 10. In some embodiments, depending on the requirements or even on the type of product dispenser used, for example, for detecting when product is fed to the forming tube 1, the machine 100 comprises at least one sensor which detects the passage of the product. In other embodiments, like in some comprising a multi-head product dispenser, it is possible to know when product is fed to the forming tube 1 by controlling the moment in which the opening of the multi-head dispenser occurs.

In the blocking position P1, the retaining device 3 is at a fixed specific height with respect to the outlet opening 12 of the forming tube 1, between the inlet opening 11 and said outlet opening 12 of said forming tube 1, and at least partially blocks the passage section of the forming tube 1 at said fixed specific height, preventing the passage of a product from said fixed specific height towards the outlet opening 12.

In the release position P2, the retaining device 3 does not block the passage section of the forming tube 1, such that when said retaining device 3 transitions from the blocking position P1 to the release position P2, the product P the falling of which had been interrupted by said retaining device 3 at the fixed specific height resumes falling through the forming tube 1 towards the outlet opening 12 from said fixed specific height, given that said retaining device 3 no longer prevents it from falling while in the release position P2.

When the retaining device 3 transitions to the release position P2, said retaining device 3 is withdrawn from the path to be taken by the product inside the forming tube 1, such that in addition to releasing the fall of said product, the retaining device 3 does not accompany the product as it falls towards the outlet opening 12 of said forming tube 1. The retaining device 3 is therefore not displaced in a vertical linear direction through the forming tube 1, which allows said retaining device 3 not to interfere with the falling of the product or to accompany it along its descent through the forming tube 1, where productivity of the machine 100 can be increased with respect to the state of the art as said product falls freely once the retaining device 3 has transitioned to the release position P2, utilizing the acceleration due to gravity.

When the machine 100 comprises a plurality of retaining devices 3, each retaining device 3 is at a fixed specific height with respect to the outlet opening 12 of said forming tube 1 in the respective blocking position P1, and said fixed specific heights are different from one another. The falling through said forming tube 1 of a product which is fed into the forming tube 1 is thereby interrupted upon reaching the fixed specific height of a retaining device 3 in the blocking position P1, and remains retained at said fixed specific height until said retaining device 3 is displaced towards the release position P2, whereby it resumes falling towards the outlet opening 12 of the forming tube 1, until reaching the fixed specific height of another retaining device 3 in the blocking position P1, where it is retained again until said retaining device 3 is displaced towards the release position P2, and so on and so forth, such that the maximum speed said product may reach upon exiting the forming tube 1 depends on the fixed specific height of the last retaining device 3 that retained said product, with the distance between said retaining device 3 and the outlet opening 12 being less than the distance between the inlet opening 11 and said outlet opening 12, with said speed thereby being lower when compared with the case in which there is no retaining device 3 whatsoever.

Preferably all the retaining devices 3 are arranged separated from one another and at the same vertical separating distance between them, such that the product travels the same height each time it falls from one retaining device 3 to the next one. It is thereby ensured that the product receives the same impact between one step and the next one (between one retaining device 3 and the next one), the packaging rate of the machine 100 is increased when more than one product is simultaneously arranged inside the forming tube 1 at different heights (see example of FIGS. 3*a* and 3*b*), and synchronization of the product dispenser, of the retaining means and of the transverse sealing and cutting tool 5, among others, is simplified because all take the same amount of time to fall from one step to the next one (from one retaining device 3 to the next one).

Figure 3A:
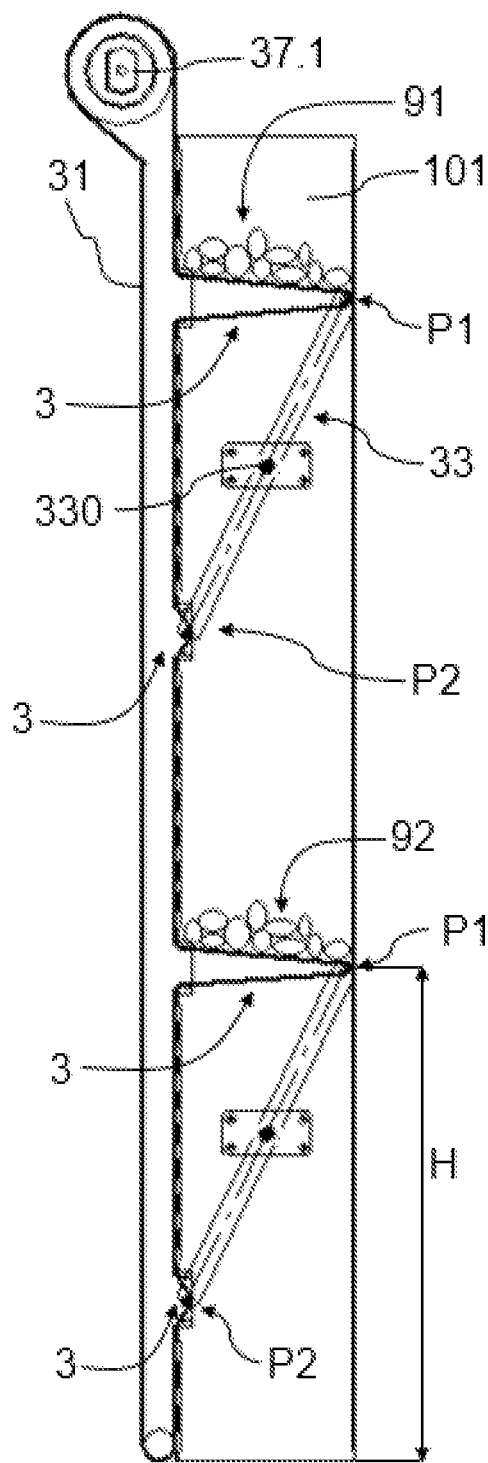
FIG. 3A shows a side view of the retaining means of FIG. 2.
Figure 3B:
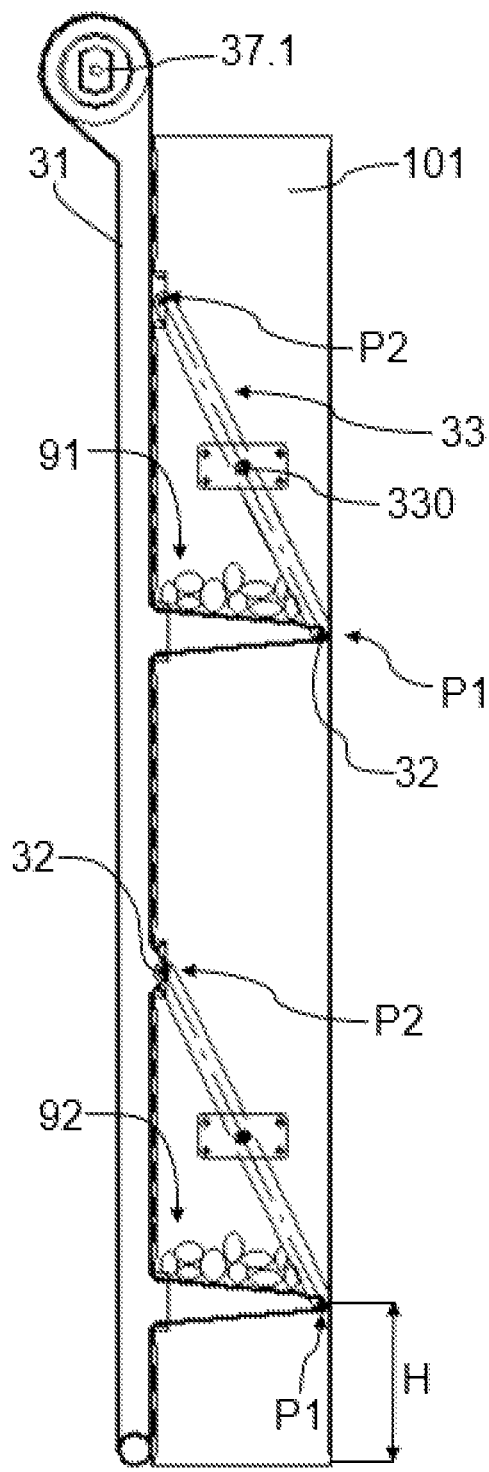
FIG. 3B shows a side view of the retaining means of FIG. 2, with the retaining devices in a different position with respect to the position in the which are in FIG. 3A.

With the help of FIGS. 3A and 3B, an example of the actuation of the retaining means of an embodiment of the machine 100 is depicted. The retaining means depicted in said figures comprise four retaining devices 3, with two of them being in the blocking position P1 and the other two in the release position P2. FIG. 3A shows two products 91 and 92, each of them supported on a retaining device 3 which is in the blocking position P1. Below each of these retaining devices 3 there is another retaining device 3 in the release position P2. When the retaining devices 3 change position (result shown in FIG. 3B), each product 91 and 92 falls until stopping on the next retaining device 3 that is in the blocking position P1. The products 91 and 92 therefore only accelerate until encountering another retaining device 3 in the blocking position P1, falling a distance equal to the distance between two contiguous retaining devices 3 before stopping or braking again, whereby preventing them from acquiring higher speeds.

At least in the examples of FIGS. 3A and 3B, the retaining structure 101 comprises a length equal to the length of the forming tube, so the height H from a lower base of said retaining structure 101 to a retaining device 3 when said retaining device 3 is in the blocking position P1 is equal to the fixed specific height corresponding with respect to the outlet opening 12 of the forming tube 1.

Figure 4A:
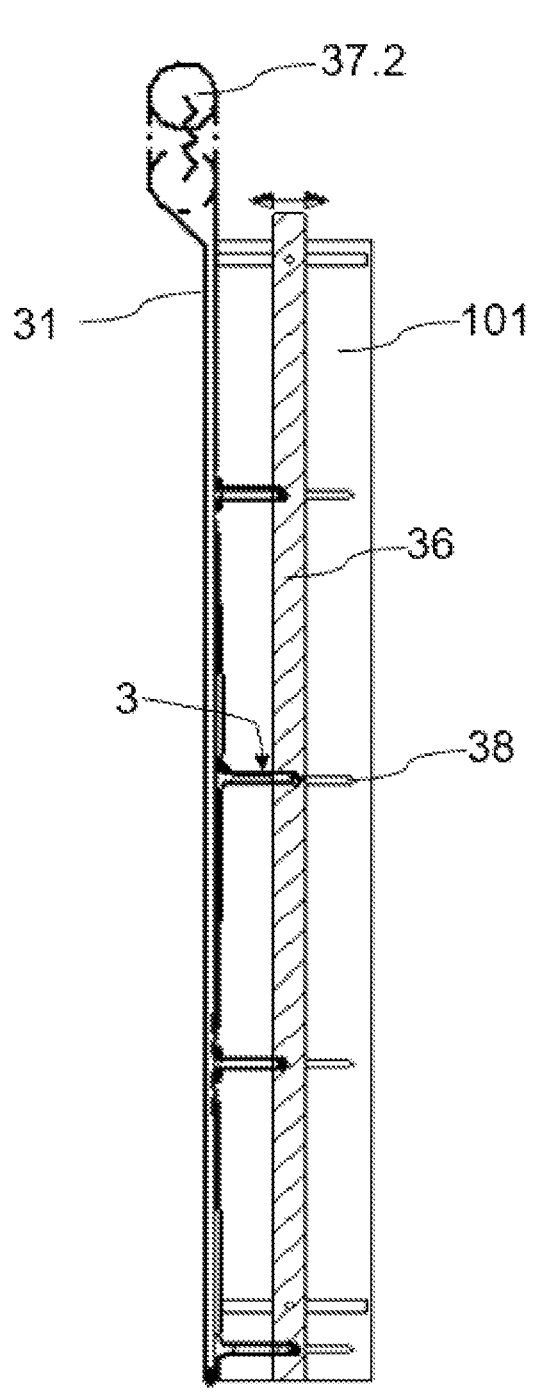
FIG. 4A shows a side view of retaining means of another embodiment comprising a plurality of retaining devices which are arranged in an intermediate position between the blocking position and the release position, which move simultaneously and which are connected to a retaining structure of said machine.
Figure 4B:
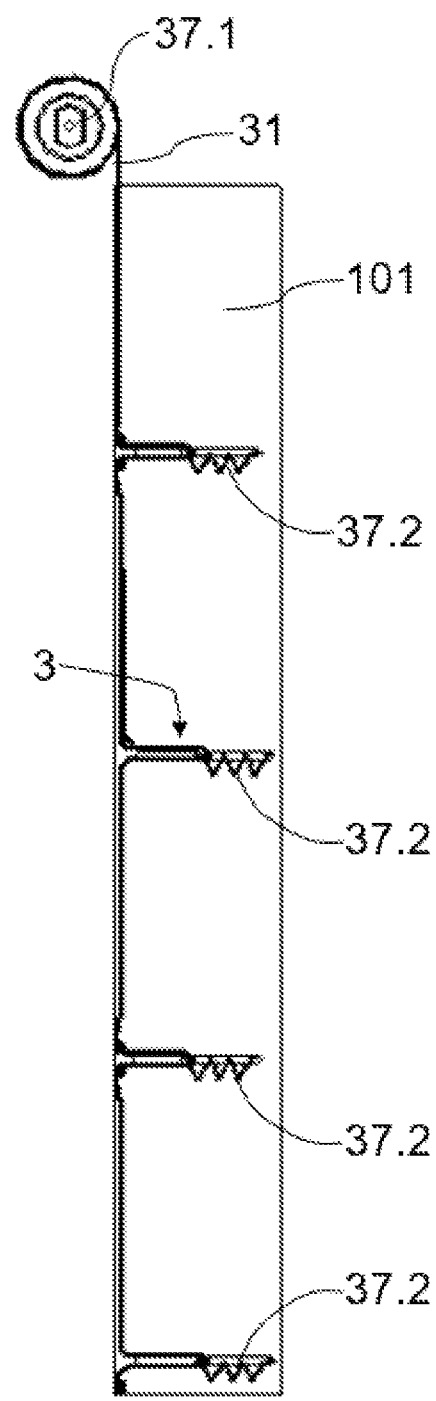
FIG. 4B shows a side view of retaining means of another embodiment comprising a plurality of retaining devices which are arranged in an intermediate position between the blocking position and the release position, which move simultaneously and which are connected to a retaining structure of said machine.

In the embodiments of the machine 100 in which the retaining means comprise a plurality of retaining devices 3, said retaining means can be configured so that when a first retaining device 3 is in the blocking position P1 another retaining device 3 contiguous to said first retaining device 3 is in the release position P2 (see example of FIGS. 3A and 3B), such that said retaining devices 3 are in the blocking position P1 and in the release position P2 in an alternating manner along the length of the forming tube 1; or said retaining means can be configured for all the retaining devices 3 to be in the same position simultaneously, with all the retaining devices 3 being in the blocking position P1 or in the release position P2 at the same time (see FIGS. 4A and 4B for example). In this latter case, the time the retaining devices 3 take to be displaced from the blocking position P1 to the release position P2 and back to the blocking position P1 is preferably less than the time it takes the corresponding product to fall from one retaining device 3 to the next retaining device 3. FIGS. 4A and 4B show two embodiments where all the retaining devices 3 are displaced simultaneously and in the same direction. In the embodiment of FIG. 4A, the retaining means comprise a connecting bar 36 (or connecting element) connecting all the retaining devices 3 to one another, and the actuating means comprise active means (no depicted) for displacing the connecting bar 36 and passive means 37.2 (counterweights in this case) for displacing the movable belt 31 and helping with the displacement of the retaining devices 3. In the embodiment of FIG. 4B, the actuating means comprises active means 37.1 for displacing the movable belt 31 and passive means 37.2 associated with each retaining device (a spring in this case).

Figure 5:
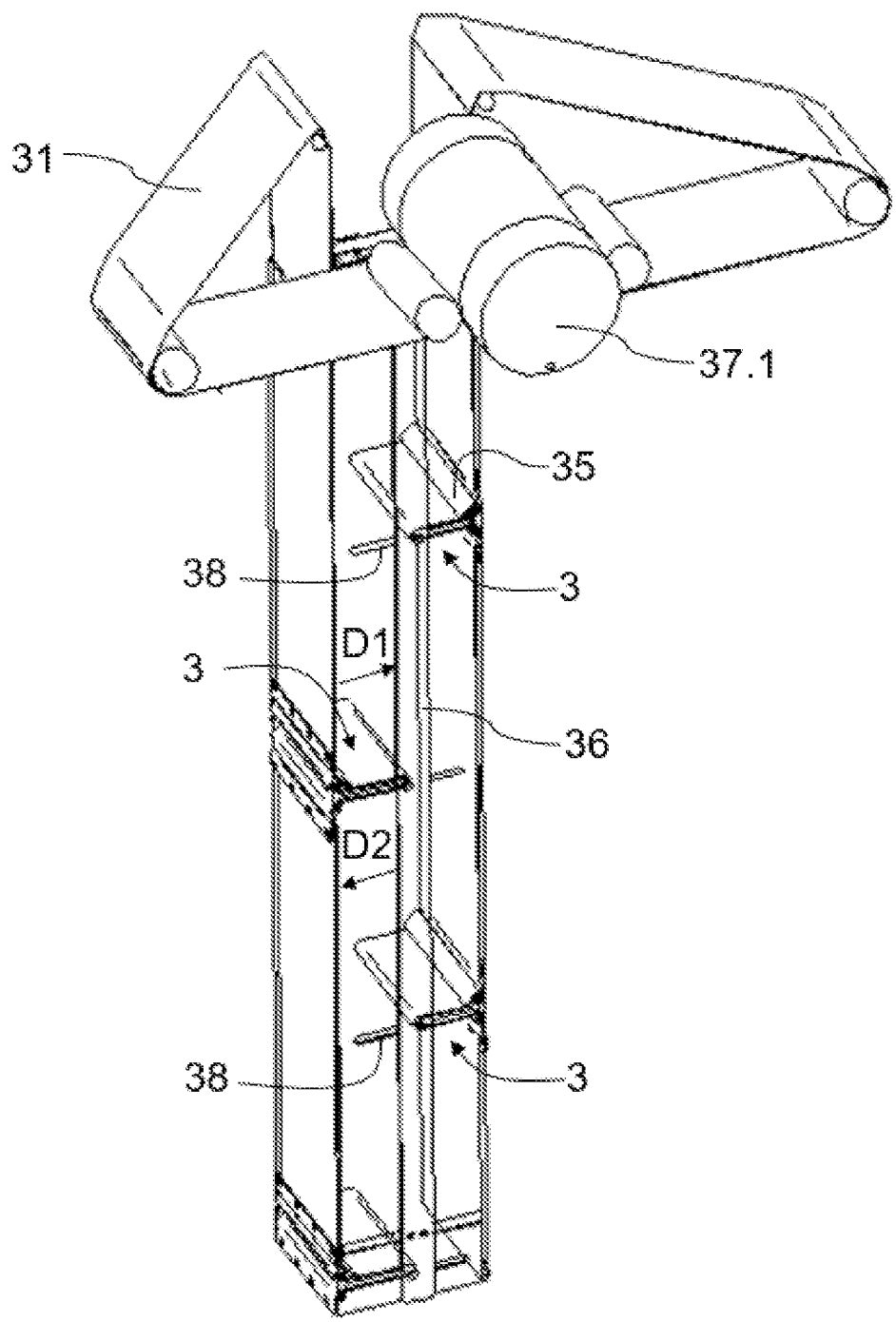
FIG. 5 shows a perspective view of retaining means of another embodiment comprising a single movable belt and being connected to a retaining structure of said machine.

When the retaining means comprises a plurality of retaining devices 3, in some embodiments of the machine 100 such as the one depicted in FIG. 5, at least one retaining device 3 is displaced in a first direction D1 inside the forming tube 1 to transition to the blocking position P1 and in a second direction D2 opposite the first direction D1 to transition to the release position P2, and at least one retaining device 3 is displaced in the second direction D2 inside the forming tube 1 to transition to the blocking position P1 and in the first direction D1 to transition to the release position P2, preferably in a synchronized manner. In FIG. 5, all the retaining devices 3 appear in an intermediate position between the blocking position P1 and the release position P2 to facilitate understanding thereof. In other embodiments, like in the embodiment shown in the examples of FIGS. 4A and 4B for example, all the retaining devices 3 are displaced in one and the same direction to transition to the blocking position P1 and in one and the same direction to transition to the release position P2.

If the machine 100 comprises inactive retaining devices 3 (which for whatever reason are not operative during the operation of the machine 100), said retaining devices 3 remain in the release position P2 at all times, so as not to interfere in the falling of the product. The explanations given above are only applied to active retaining devices 3 (the retaining devices 3 that are indeed operative and change position during the operation of the machine 100).

In some embodiments of the machine 100, the retaining means comprises a pulling element 32 associated with each retaining device 3, and said pulling element 32 is displaceable inside the forming tube 1 when the associated retaining device 3 changes position. In the case where the machine 100 comprises a connecting bar 36, said connecting bar 36 preferably connects the corresponding retaining devices 3 through the pulling elements 32. The retaining means further comprise at least one movable belt 31 (for example a conveyor belt) and said movable belt 31 and the pulling element 32 are integrally displaced, such that a segment of said movable belt 31 associated with a pulling element 32 is left extended within the forming tube 1 when the corresponding retaining device 3 is in the blocking position P1, said segment of the movable belt 31 at least partially blocking the inner passage section of the forming tube 1 and said segment acting like a retaining device 3. Preferably, in these cases the forming tube 1 comprises at least two facing vertical walls such as those mentioned above, and the pulling element 32 is configured for being displaced between both walls. The retaining means preferably comprise one deflector 35 upstream of the pulling element 32 and another deflector 35 downstream of said pulling element 32 associated with each retaining device 3, for guiding the displacement of the movable belt 31. A pulling element 32 preferably comprises a roller, a rod or a similar element.

The segment of the movable belt 31 associated with the pulling element 32 can be arranged outside or inside the forming tube 1, or the retaining structure 101 in the embodiments of the machine 100 comprising a retaining structure 101, with the corresponding retaining device 3 in the release position P2. In the embodiments comprising said segment of movable belt 31 arranged outside the retaining element 101 or outside the forming tube 1, the deflectors 35 may correspond, for example, with a through hole made in the retaining structure 101 and/or in the forming tube 1, as appropriate, to introduce the movable belt 31 therein. In other embodiments in which the segment of movable belt 31 is arranged inside the forming tube 1 or inside the structure 101, the deflectors 35 may correspond, for example, with a roller, a rod or the like arranged inside the forming tube 1.

In the simplest embodiments of the machine 100 comprising retaining means of this type, said machines 100 comprise a single retaining device 3, a single pulling element 32 and a single movable belt 31. However, in other less simple embodiments, the machines 100 comprise a plurality of retaining devices 3, one pulling element 32 associated with each retaining device 3 and one or more movable belts 31. For example, in the embodiment of FIGS. 3A and 3B, the retaining means comprise a single movable belt 31 associated with all the pulling elements 32, while in the embodiment shown in FIG. 6, the drawing means comprise two movable belts 31 (otherwise, this embodiment is similar to that of FIGS. 3A and 3B).

Figure 6:
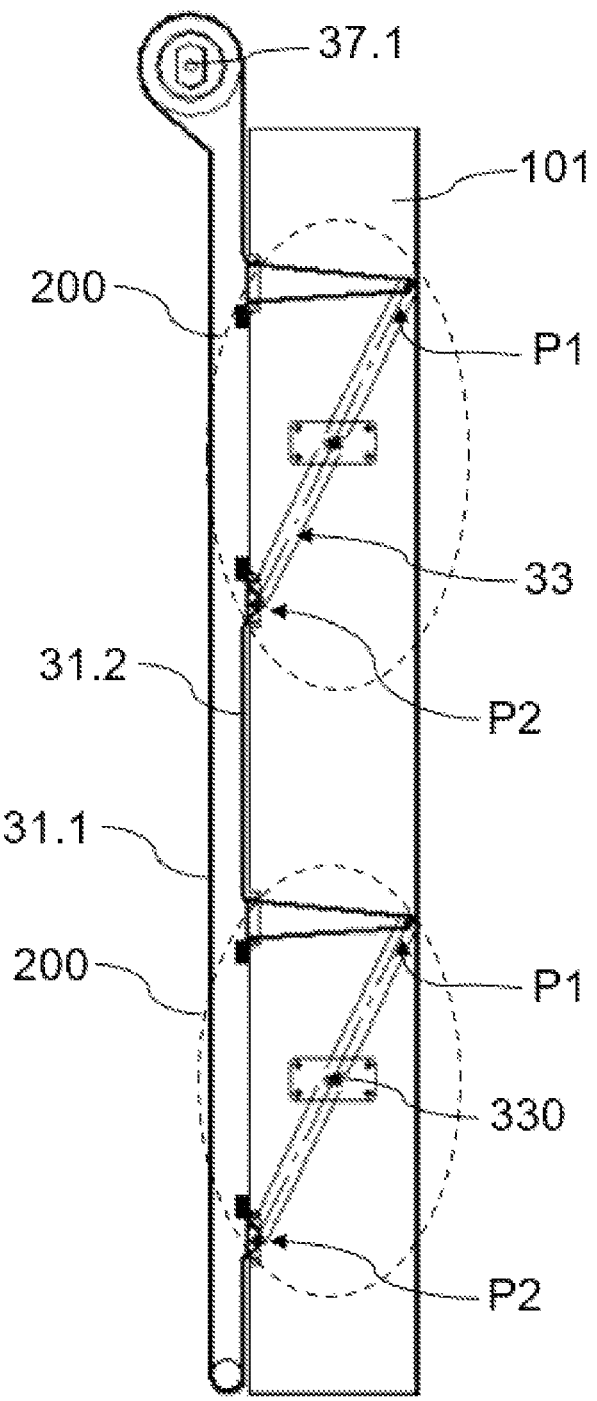
FIG. 6 shows a side view of retaining means of another embodiment comprising two retaining assemblies associated by means of two movable belts and being connected to a retaining structure of said machine.

In some embodiments of the machine 100, like in the first embodiment and in the embodiment of FIG. 6 for example, the retaining means comprise at least one retaining assembly 200 with a first retaining device 3 and a second retaining device 3 distributed longitudinally along the length of the forming tube 1, the retaining device that is farthest from the outlet opening 12 of the forming tube 1 being the first retaining device 3 and the retaining device that is closest to the outlet opening 12 of the forming tube 1 being the second retaining device 3. The retaining assembly 200 comprises a connecting unit 33 for connecting to one another the two pulling elements 32 associated with the two retaining devices 3 of said retaining assembly, and said connecting unit 33 comprises a rotating shaft 330 fixed with respect to the forming tube 1 and a connecting bar 331 connecting both pulling elements 32. The rotating shaft 330 is connected directly to the forming tube 1 or to the retaining structure 101 in the embodiments of the machine 100 comprising a retaining structure 101. The connecting unit 33 may comprise two parallel connecting bars 331, as shown in FIG. 2. Each of the connecting bars 331 are connected to the two pulling elements 32 of said retaining assembly 200 and they are arranged facing one another on each side of said pulling elements 32. Each rotating shaft 330 is connected to both connecting bars 331. The connecting bars 331, and therefore the pulling elements 32, rotate with respect to the rotating shaft 330 when a position change of the retaining devices 3 of the retaining assembly 200 is caused, such that both retaining devices 3 of one and the same retaining assembly 200 change position simultaneously with a single actuation. Therefore, in a retaining assembly 200, when the first retaining device 3 is in the blocking position P1, the second retaining device 3 is in the release position P2 and vice versa.

In some embodiments of the machine 100, like in the first embodiment and in the embodiment of FIG. 6 for example, the retaining means comprises a plurality of retaining assemblies 200 like those described above, and said retaining assemblies 200 are distributed along the length of the forming tube 1, one after the other. In some of these embodiments, like in the first embodiment for example, the retaining means comprise a single movable belt 31 which is associated with all the retaining assemblies 200 (and therefore with all the retaining devices 3 of the retaining means).

In other embodiments of the machine 100 in which the retaining means comprises a plurality of retaining assemblies 200, as depicted, for example, in FIG. 6 where two retaining assemblies 200 are depicted, said retaining means comprises a number of movable belts 31.1 and 31.2 equal to the number of retaining assemblies 200 (two in this case). A movable belt 31.1 is associated with the first retaining device 3 of the retaining assembly 200 farthest from the outlet opening 12 of the forming tube 1 and with the second retaining device 3 of the retaining assembly 200 closest to said outlet opening 12, and each of the remaining movable belts 31.2 is associated with the second retaining device 3 of a retaining assembly 200 and with the first retaining device 3 of the retaining assembly 200 arranged contiguous to and downstream of said retaining assembly 200.

Figure 7:
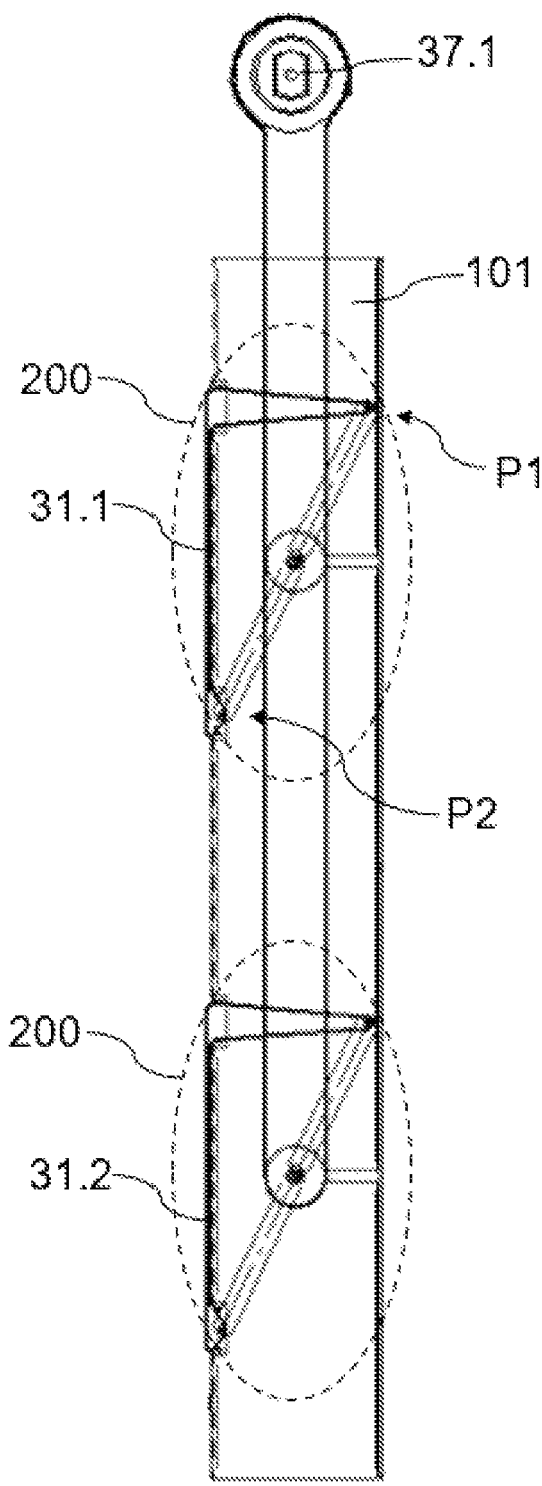
FIG. 7 shows a side view of retaining means of another embodiment comprising two retaining assemblies associated with actuating means of the machine and being connected to a retaining structure of said machine.

In other embodiments of the machine 100, like those shown in FIG. 7 in which two retaining assemblies 200 are depicted, the retaining means comprises a plurality of retaining assemblies 200 distributed along the length of the forming tube 1 one after the other and a number of movable belts 31.1 and 31.2 equal to the number of retaining assemblies 200 (two in this case). Each movable belt 31.1 and 31.2 is associated with the first retaining device 3 and with the second retaining device 3 of one and the same retaining assembly 200. In these embodiments, as occurs in the embodiment of FIG. 7, the actuating means are preferably associated with all the retaining assemblies 200, such that all the retaining devices 3 are displaced simultaneously.

Figure 8:
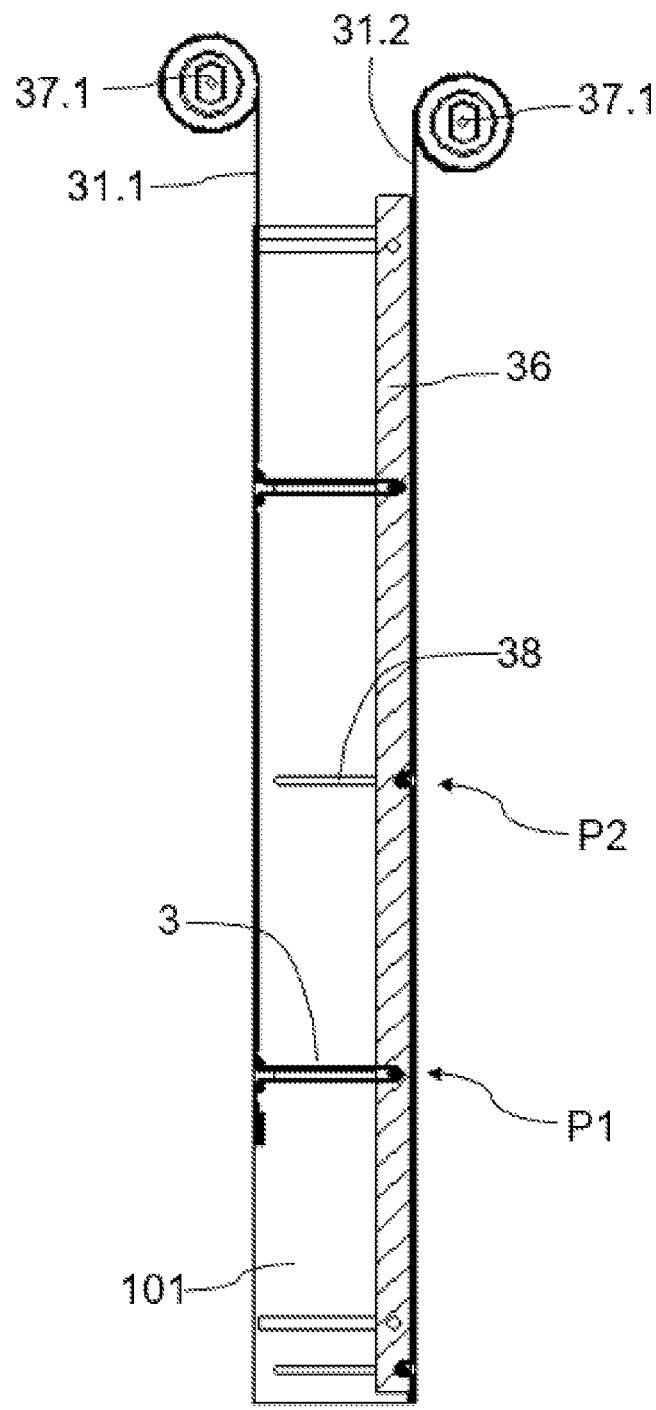
FIG. 8 shows a side view of retaining means of another embodiment comprising two movable belts with respective active actuating means for each movable belt and being connected to a retaining structure of said machine.

In some embodiments of the machine 100 in which the retaining means comprises a plurality of retaining devices 3, one pulling element 32 for each retaining device 3 and at least one movable belt 31, at least one pulling element 32 is displaced in a first direction D1 when the corresponding retaining device 3 transitions to the blocking position P1 and in a second direction D2 opposite the first direction D1 when said corresponding retaining device 3 transitions to the release position P2, and at least one pulling element 32 is displaced in the second direction D2 when the corresponding retaining device 3 transitions to the blocking position P1 and in the first direction D1 when the corresponding retaining device 3 transitions to the release position P2. The retaining devices 3 and the pulling elements 32 of which are displaced in the first direction D1 to transition to the blocking position P1 may form a first retaining group, and the retaining devices 3 and the pulling elements 32 of which are displaced in the second direction D2 to transition to the blocking position may form a second retaining group, thereby comprising the retaining means two retaining groups. The retaining devices 3 of the first retaining group are configured for being in the blocking position P1 when the retaining devices 3 of the second retaining group are in the release position P2 and the retaining devices 3 of the first retaining group with being configured for being in the release position P2 when the retaining devices 3 of the second retaining group are the blocking position P1. One and the same movable belt 31 can be associated with all the pulling elements 32 (see FIG. 5), or the retaining means may comprise a first web 31.1 associated with all the pulling elements 32 of the first retaining group and a second movable belt 31.2 associated with all the pulling elements 32 of the second retaining group (see FIG. 8). In the case of the embodiment depicted in FIG. 8, the actuating means comprise respective active means 37.1 for each movable belt 31.1 and 31.2.

Some of the embodiments of the machine 100 comprising a plurality of retaining devices 3 with associated pulling elements 32 and at least one movable belt 31, to facilitate simultaneous displacement of all the retaining devices 3 the retaining means may further comprise a connecting element 36 for connecting to one another all the pulling elements 32, as occurs in the embodiments shown in some figures.

In any of the embodiments of the machine 100 in which the retaining means comprise at least one pulling element 32, said retaining means may comprise guiding means 38 for guiding the displacement of the pulling element 32 (see FIGS. 4A, 4B and 5, for example). For example, the forming tube 1, or the retaining structure 101 in the embodiments of the machine 100 comprising a retaining structure 101, may comprise a groove (which can be a pass-through groove) having the shape of the desired displacement (linear or curved, for example), and one end of the pulling element 32 (or an additional element connected to said end of the pulling element 32) is housed in the groove. The guiding means preferably comprise two grooves, one groove associated with each end of the pulling element 32. Alternatively, the forming tube 1, or the retaining structure 101 in the embodiments of the machine 100 comprising a retaining structure 101 may comprise a complementary protrusion or a guide (not depicted in the figures), and the pulling element 32 may comprise a groove cooperating with the guide or the protrusion of the forming tube 1 or of the retaining structure 101 in the embodiments of the machine 100 comprising a retaining structure 101.

In some embodiments of the machine 100 not depicted in the figures, the retaining device 3 comprises a bending element housed longitudinally inside the forming tube 1 and connected at a first end to said forming tube 1. The actuating means would preferably be associated with a second end of the bending element and configured for causing, with the actuation thereof, the displacement of said second end towards the first end of the bending element for causing the transitioning of the retaining device 3 to the blocking position, such that with said displacement the bending element bends and part of said bending element is displaced towards the inside of the forming tube 1 (from one wall to the facing wall of the forming tube 1), at least partially blocking the inner passage section of said forming tube 1.

In some embodiments of the machine 100 not depicted in the figures, in which the retaining means comprise one or more retaining devices 3, each retaining device 3 comprises a platform housed inside the forming tube 1, associated with the actuating means, with the platform being connected with rotational freedom to the actuating means through a non-vertical rotating shaft, with said platform being configured for rotating with respect to said rotating shaft in a controlled manner for causing the position change of the retaining device 3. The position change of the platform can be done by means of an actuator, such as a cylinder for example.

In other embodiments of the machine 100 not depicted in the figures, in which the retaining means comprises one or more retaining devices 3, each retaining device 3 comprises a platform housed inside the forming tube 1. The platform of each retaining device 3 is arranged on an inflatable chamber housed in the forming tube 1 such that the inflatable chamber, with the inflation thereof, causes said platform to partially block the passage section of the forming tube 1. The inflatable chamber is preferably connected or adhered to the platform and causes the platform to be horizontal in the blocking position. The control unit 4 is in charge of controlling the actuation of the actuator or the inflation/deflation of the inflatable chamber.

In other embodiments of the machine 100 not depicted in the figures, in which the retaining tool comprises one or more retaining devices 3, each retaining device 3 comprises an inflatable chamber which is housed at least partially in the forming tube 1. The actuating means would be configured for inflating said inflatable chamber for causing the position change of the retaining device 3, the retaining device 3 at least partially blocking the passage section of the forming tube 1 when the inflatable chamber is inflated. The control unit 4 is in charge of controlling inflation/deflation of the inflatable chamber.

The following clauses disclose additional embodiments.

Clause 1. Vertical packaging machine comprising a vertical forming tube (1) with a product inlet opening (11), a product outlet opening (12) downstream of the inlet opening (11) and an inner passage section, the machine (100) further comprises retaining means associated with the forming tube (1) and comprising at least one retaining device (3) configured for being displaced between a blocking position (P1) in which it at least partially blocks the inner passage section of the forming tube (1) between the inlet opening (11) and the outlet opening (12), and a release position (P2) in which it does not block said inner passage section of the forming tube (1), with the retaining device (3), in the blocking position (P1), being arranged at a fixed specific height with respect to the outlet opening (12) of the forming tube (1) and configured for preventing a product from passing through said inner passage section of the forming tube (1), and with said retaining device (3) further being configured for, upon transitioning from the blocking position (P1) to the release position (P2), being at least partially withdrawn from the path to be followed by said product through said inner passage section of the forming tube (1).

Clause 2. Vertical packaging machine according to clause 1, wherein the retaining means comprise a plurality of retaining devices (3), with each retaining device (3) being configured for being displaced between a respective blocking position (P1) in which it at least partially blocks the inner passage section of the forming tube (1) and a respective release position (P2) in which it does not block said inner passage section of the forming tube (1), with each retaining device (3) being arranged at a fixed specific height with respect to the outlet opening (12) of said forming tube (1) in the respective blocking position (P1) and with said fixed specific heights being different from one another.

Clause 3. Vertical packaging machine according to clause 2, wherein the retaining means further comprise a pulling element (32) associated with each retaining device (3), with said pulling element (32) being displaceable inside the forming tube (1) when said retaining device (3) changes position between the blocking position (P1) and the release position (P2); at least one movable belt (31) displaced together with the pulling element (32), such that a segment of said movable belt (31) associated with said pulling element (32) is left extended within the forming tube (1), at least partially blocking the inner passage section of the forming tube (1) when the corresponding retaining device (3) is in the blocking position (P1); and actuating means configured for causing the position change of the retaining device (3).

Clause 4. Vertical packaging machine according to clause 3, wherein at least one retaining device (3) is configured for being displaced in a first direction (D1) inside the forming tube (1) to transition to the blocking position (P1) and in a second direction (D2) opposite the first direction (D1) to transition to the release position (P2), and at least one retaining device (3) is configured for being displaced in the second direction (D2) inside the forming tube (1) to transition to the blocking position (P1) and in the first direction (D1) to transition to the release position (P2), with the retaining means being configured for one of said retaining devices (3) to be in the blocking position (P1) when the other retaining device (3) is in the release position (P2).

Clause 5. Vertical packaging machine according to clause 4, wherein the retaining means comprise at least one retaining assembly (200) comprising a first retaining device (3) and a second retaining device (3) distributed longitudinally along the length of the forming tube (1), with the first retaining device (3) being the retaining device that is farthest from the outlet opening (12) of the forming tube (1) and with the second retaining device (3) being the retaining device that is closest to the outlet opening (12) of the forming tube (1), said retaining assembly (200) further comprising a connecting unit (33) configured for connecting to one another the two pulling elements (32) associated with the two retaining devices (3) of said retaining assembly (200), and said connecting unit (33) comprising a rotating shaft (330) fixed with respect to the forming tube (1) for, with the rotation of the connecting unit (33) with respect to the rotating shaft (330), simultaneously changing the position of the first retaining device (3) and of the second retaining device (3).

Clause 6. Vertical packaging machine according to clause 5, wherein the retaining means comprise a plurality of retaining assemblies (200) distributed along the length of the forming tube (1) one after the other, and one and the same movable belt (31) associated with all the retaining devices (3), such that all the retaining devices (3) are displaced simultaneously.

Clause 7. Vertical packaging machine according to clause 5, wherein the retaining means comprise a plurality of retaining assemblies (200) distributed along the length of the forming tube (1) one after the other, and a number of movable belts (31.1, 31.2) equal to the number of retaining assemblies (200), with a first movable belt (31.1) being associated with the first retaining device (3) of the retaining assembly (200) farthest from the outlet opening (12) of the forming tube (1) and with the second retaining device (3) of the retaining assembly (200) arranged closest to said outlet opening (12), and with each of the remaining movable belts (31.2) being associated with the second retaining device (3) of a retaining assembly (200) and with the first retaining device (3) of the retaining assembly (200) arranged contiguous to and downstream of said retaining assembly (200), such that all the retaining devices (3) are displaced together.

Clause 8. Vertical packaging machine according to clause 5, wherein the retaining means comprise a plurality of retaining assemblies (200) distributed along the length of the forming tube (1) one after the other, and a movable belt (31.2, 31.2) associated respectively with each retaining assembly (200), such that said retaining means comprise a number of movable belts (31.2, 31.2) equal to the number of retaining assemblies (200), with each movable belt (31.2, 31.2) being associated with the first retaining device (3) and with the second retaining device (3) of the associated retaining assembly (200), and with the actuating means being configured for causing the simultaneous displacement of the retaining devices (3) of all the retaining assemblies (200).

Clause 9. Vertical packaging machine according to clause 4, wherein the retaining means comprise a plurality of retaining devices (3) displaceable in the first direction (D1) to transition to the blocking position (P1), said retaining devices (3) forming a first retaining group, and a plurality of retaining devices (3) displaceable in the second direction (D2) to transition to the blocking position (P1), said retaining devices (3) forming a second retaining group, the retaining devices (3) of the first retaining group and of the second retaining group being arranged in an alternating manner along the length of the forming tube (1), and the movable belt (31) being associated with all the pulling elements (32), or the movable belt (31.1) being associated with all the pulling elements (32) of the first retaining group and the retaining means comprising a second movable belt (31.2) associated with all the pulling elements (32) of the second retaining group; the retaining devices (3) of the first retaining group being configured for being in the blocking position (P1) when the retaining devices (3) of the second retaining group are in the release position (P2), and vice versa, the actuating means being configured for causing the simultaneous displacement of the retaining devices (3).

Clause 10. Vertical packaging machine according to clause 9, wherein the retaining means comprise a connecting unit (33) connected to all the pulling elements (32) of the retaining devices (3) of the first retaining group and of the second retaining group, such that the retaining means are configured for all the retaining devices (3) to be displaced simultaneously.

Clause 11. Vertical packaging machine according to clause 3, wherein the movable belt (31) is associated with all the pulling elements (32) and the retaining means are configured for all the retaining devices (3) to change position simultaneously.

Clause 12. Vertical packaging machine according to clause 11, wherein the retaining means further comprise a connecting unit (33) connecting all the pulling elements (32) to one another.

Clause 13. Vertical packaging machine according to any of clauses 3 to 12, wherein the actuating means comprise at least active means (37.1) acting on at least one of the elements displaced during the position change of a retaining device (3), or at least active means (37.1) and at least passive means (37.2) acting on at least one of said elements.

Clause 14. Vertical packaging machine according to any of clauses 1 to 13, comprising a retaining structure (101) housed in the forming tube (1) and fixed to the forming tube (1), the retaining means being connected to the retaining structure (101) such that said retaining means are associated with the forming tube (1) through said retaining structure (101).

Clause 15. Vertical packaging machine according to clause 14, wherein the forming tube (1) or the retaining structure (101) comprise first guiding means configured for guiding the displacement of each pulling element (32) and second guiding means configured for guiding the segment of the movable belt (31) associated with the pulling element (32) that is left extended within the forming tube (1) when the corresponding retaining device (3) is in the blocking position (P1).

What is claimed is:

1. A vertical packaging machine for packaging a product, the vertical packaging machine comprising:
   a vertical forming tube having a product inlet opening, a product outlet opening located below and downstream of the product inlet opening, and an inner passage section extending between the product inlet opening and product outlet opening, the inner passage section providing a pathway through which the product drops; and
   a first retaining device located in the inner passage at a first height above the product outlet opening, the first retaining device being configured to transition between a blocking position and a release position, in the blocking position the first retaining device is configured to block a first portion of the pathway to prevent the product from dropping through the first portion of the pathway, in the release position the first retaining device being at least partially withdrawn from the pathway to permit the product to drop through the first portion of the inner passage section, the first retaining device being at a constant fixed height above the product outlet opening of the vertical forming tube when in the blocking position, the first retaining device not accompanying the product as the product drops.

2. The vertical packaging machine according to claim 1, further comprising a second retaining device located in the inner passage at a second height above the product outlet opening, the second height being below the first height, the second retaining device being configured to transition between a blocking position and a release position, in the blocking position the second retaining device is configured to block a second portion of the pathway to prevent the product from dropping to the product outlet opening, in the release position the second retaining device being at least partially withdrawn from the pathway to permit the product to drop through the second portion of the pathway, the second retaining device not accompanying the product as the product drops.

3. The vertical packaging machine according to claim 1, wherein the first retaining device comprises a first segment of a moveable belt coupled to a first pulling element, the first pulling element being displaceable inside the vertical forming tube when the first retaining device transitions between the blocking position and the release position, the first segment of the movable belt configured to extend into the pathway of the inner passage section when the first retaining device is in the blocking position.

4. The vertical packaging machine according to claim 2, wherein the first retaining device comprises a first segment of a first moveable belt coupled to a first pulling element, the first pulling element being displaceable inside the vertical forming tube when the first retaining device transitions between the blocking position and the release position, the first segment of the first movable belt configured to extend into the pathway of the inner passage section when the first retaining device is in the blocking position, the second retaining device comprises a first segment of a second moveable belt coupled to a second pulling element, the second pulling element being displaceable inside the vertical forming tube when the second retaining device transitions between the blocking position and the release position, the first segment of the second movable belt configured to extend into the pathway of the inner passage section when the second retaining device is in the blocking position.

5. The vertical packaging machine according to claim 2, wherein the first retaining device comprises a first segment of a moveable belt coupled to a first pulling element, the first pulling element being displaceable inside the vertical forming tube when the first retaining device transitions between the blocking position and the release position, the first segment of the movable belt configured to extend into the pathway of the inner passage section when the first retaining device is in the blocking position, the second retaining device comprises a second segment of the moveable belt coupled to a second pulling element, the second pulling element being displaceable inside the vertical forming tube when the second retaining device transitions between the blocking position and the release position, the second segment of the movable belt configured to extend into the pathway of the inner passage section when the second retaining device is in the blocking position.

6. The vertical packaging machine according to claim 4, wherein the first and second retaining devices transition simultaneously between their respective blocking and release positions.

7. The vertical packaging machine according to claim 2, wherein the first retaining device is configured to be displaced in a first direction inside the vertical forming tube to transition to the blocking position and in a second direction opposite the first direction to transition to the release position, the second retaining device is configured to be displaced in the second direction inside the vertical forming tube to transition to the blocking position and in the first direction to transition to the release position.

8. The vertical packaging machine according to claim 7, wherein when the first retaining device is in the blocking position the second retaining device is in the release position.

9. The vertical packaging machine according to claim 4, further comprising a connecting unit configured to connect the first and second pulling elements, the connecting unit being coupled to a rotating shaft fixed with respect to the vertical forming tube, the connecting unit and rotating shaft being configured such that upon there being a rotating of the connecting unit with respect to the rotating shaft the first and second retaining devices simultaneously transition between their blocking and release positions.

10. A vertical packaging machine according to claim 4, comprising a first plurality of retaining devices that includes the first retaining device and a second plurality of retaining devices that includes the second retaining device, each of the first plurality of retaining devices being displaceable in the first direction to transition to the blocking position, each of the second plurality of retaining devices displaceable in the second direction to transition to the blocking position, the first plurality of retaining devices and the second plurality of retaining devices being arranged in an alternating manner along a vertical length of the vertical forming tube.

11. The vertical packaging machine according to claim 10, wherein upon each of the first plurality of retaining devices being in the blocking position, each of the second plurality of retaining devices is in the release position and vice versa.

12. The vertical packaging machine according to claim 10, wherein the first plurality of retaining devices comprises a plurality of segments of the first moveable belt and the second plurality of retaining devices comprises a plurality of segments of the second moveable belt.

13. The vertical packaging machine according to claim 11, wherein the first plurality of retaining devices comprises a plurality of segments of the first moveable belt and the second plurality of retaining devices comprises a plurality of segments of the second moveable belt.

14. The vertical packaging machine according to claim 10, wherein each of the first plurality of retaining devices and each of the second plurality of retaining devices comprises a pulling element, the vertical packaging machine further comprising a connecting unit coupled to all of the pulling elements, the connecting unit being coupled to one or more rotating shafts fixed with respect to the vertical forming tube, the connecting unit and the one or more rotating shafts being configured such that upon there being a rotating of the connecting unit with respect to the rotating shaft all of the first and second plurality of retaining devices simultaneously transition between their blocking and release positions.

15. The vertical packaging machine according to claim 1, further comprising a retaining structure housed in and fixed to the vertical forming tube, the first retaining device being connected to the retaining structure and not to the vertical forming tube.

16. A vertical packaging machine for packaging a product, the vertical packaging machine comprising:
a vertical forming tube having a product inlet opening, a product outlet opening located below and downstream of the product inlet opening, and an inner passage section extending between the product inlet opening and product outlet opening, the inner passage section providing a pathway through which the product drops;
a first retaining device located in the inner passage at a first height above the product outlet opening, the first retaining device being configured to transition between a blocking position and a release position, in the blocking position the first retaining device is configured to block a first portion of the pathway to prevent the product from dropping through the first portion of the pathway, in the release position the first retaining device being at least partially withdrawn from the pathway to permit the product to drop through the first portion of the inner passage section, the first retaining device not accompanying the product as the product drops;
a second retaining device located in the inner passage at a second height above the product outlet opening, the second height being below the first height, the second retaining device being configured to transition between a blocking position and a release position, in the blocking position the second retaining device is configured to block a second portion of the pathway to prevent the product from dropping to the product outlet opening, in the release position the second retaining device being at least partially withdrawn from the pathway to permit the product to drop through the second portion of the pathway, the second retaining device not accompanying the product as the product drops,
the first retaining device comprises a first segment of a first moveable belt coupled to a first pulling element, the first pulling element being displaceable inside the vertical forming tube when the first retaining device transitions between the blocking position and the release position, the first segment of the first movable belt configured to extend into the pathway of the inner passage section when the first retaining device is in the blocking position, the second retaining device comprises a first segment of second moveable belt coupled to a second pulling element, the second pulling element being displaceable inside the vertical forming tube when the second retaining device transitions between the blocking position and the release position, the first segment of the second movable belt configured to extend into the pathway of the inner passage section when the second retaining device is in the blocking position,
the vertical packaging machine further comprising a connecting unit configured to connect the first and second pulling elements, the connecting unit being coupled to a rotating shaft fixed with respect to the vertical forming tube, the connecting unit and rotating shaft being configured such that upon there being a rotating of the connecting unit with respect to the rotating shaft the first and second retaining devices simultaneously transition between their blocking and release positions.

17. A vertical packaging machine for packaging a product, the vertical packaging machine comprising:
a vertical forming tube having a product inlet opening, a product outlet opening located below and downstream of the product inlet opening, and an inner passage section extending between the product inlet opening and product outlet opening, the inner passage section providing a pathway through which the product drops;
a first retaining device located in the inner passage at a first height above the product outlet opening, the first retaining device being configured to transition between a blocking position and a release position, in the blocking position the first retaining device is configured to block a first portion of the pathway to prevent the product from dropping through the first portion of the pathway, in the release position the first retaining device being at least partially withdrawn from the pathway to permit the product to drop through the first portion of the inner passage section, the first retaining device not accompanying the product as the product drops;
a second retaining device located in the inner passage at a second height above the product outlet opening, the second height being below the first height, the second retaining device being configured to transition between a blocking position and a release position, in the blocking position the second retaining device is configured to block a second portion of the pathway to prevent the product from dropping to the product outlet opening, in the release position the second retaining device being at least partially withdrawn from the pathway to permit the product to drop through the second portion of the pathway, the second retaining device not accompanying the product as the product drops,
the first retaining device comprises a first segment of a first moveable belt coupled to a first pulling element, the first pulling element being displaceable inside the vertical forming tube when the first retaining device transitions between the blocking position and the release position, the first segment of the first movable belt configured to extend into the pathway of the inner passage section when the first retaining device is in the blocking position, the second retaining device comprises a first segment of second moveable belt coupled to a second pulling element, the second pulling element being displaceable inside the vertical forming tube when the second retaining device transitions between the blocking position and the release position, the first segment of the second movable belt configured to extend into the pathway of the inner passage section when the second retaining device is in the blocking position,
the vertical packaging machine comprising a first plurality of retaining devices that includes the first retaining device and a second plurality of retaining devices that includes the second retaining device, each of the first plurality of retaining devices being displaceable in the first direction to transition to the blocking position, each of the second plurality of retaining devices displaceable in the second direction to transition to the blocking position, the first plurality of retaining devices and the second plurality of retaining devices being arranged in an alternating manner along a vertical length of the vertical forming tube.

\* \* \* \* \*